(12) United States Patent
Altintas

(10) Patent No.: US 11,614,461 B2
(45) Date of Patent: Mar. 28, 2023

(54) INFORMATION PROCESSING DEVICE AND INFORMATION PROCESSING METHOD

(71) Applicant: SONY CORPORATION, Tokyo (JP)

(72) Inventor: Ersin Altintas, Saitama (JP)

(73) Assignee: SONY CORPORATION, Tokyo (JP)

( * ) Notice: Subject to any disclaimer, the term of this patent is extended or adjusted under 35 U.S.C. 154(b) by 405 days.

(21) Appl. No.: 16/753,632

(22) PCT Filed: Jul. 17, 2018

(86) PCT No.: PCT/JP2018/026706
§ 371 (c)(1),
(2) Date: Apr. 3, 2020

(87) PCT Pub. No.: WO2019/073647
PCT Pub. Date: Apr. 18, 2019

(65) Prior Publication Data
US 2020/0241033 A1 Jul. 30, 2020

(30) Foreign Application Priority Data

Oct. 12, 2017 (JP) .............................. JP2017-198314

(51) Int. Cl.
*G01P 15/08* (2006.01)
*G01C 19/00* (2013.01)

(52) U.S. Cl.
CPC .............. *G01P 15/08* (2013.01); *G01C 19/00* (2013.01)

(58) Field of Classification Search
CPC .... G01C 21/16; G01C 19/00; G01C 19/5776; G01D 3/02; G01D 3/08; G01P 15/00; G01P 15/08
(Continued)

(56) References Cited

U.S. PATENT DOCUMENTS 10,207,719 B2 * 2/2019 Hayner ............. G01N 27/4163
2008/0247313 A1 10/2008 Nath et al.
(Continued)

FOREIGN PATENT DOCUMENTS

CN 102346198 A 2/2012
CN 105340364 A 2/2016
(Continued)

OTHER PUBLICATIONS

Extended European Search Report of EP Application No. 18866315.7 dated Nov. 2, 2020, 09 pages.
(Continued)

*Primary Examiner* — John H Le
(74) *Attorney, Agent, or Firm* — Chip Law Group

(57) ABSTRACT

The present technology is directed to easily and more accurately acquiring output signals relating to a plurality of inertial sensors. Provided is an information processing device including a combining unit that stepwisely combines output signals relating to a plurality of inertial sensors, in which the combining unit clusters a plurality of the output signals into a plurality of clusters and stepwisely combines the output signals in each of the clusters, and at least one of the clusters includes a plurality of the output signals. Furthermore, provided is an information processing method including stepwisely combining, by a processor, output signals relating to a plurality of inertial sensors, in which the combining further includes clustering a plurality of the output signals into a plurality of clusters and stepwisely combining the output signals in each of the clusters, and at least one of the clusters includes a plurality of the output signals.

17 Claims, 16 Drawing Sheets

(58) Field of Classification Search
USPC .......................................................... 702/141
See application file for complete search history.

(56) References Cited

U.S. PATENT DOCUMENTS

| | | |
|---|---|---|
| 2009/0323643 A1 | 12/2009 | Jeon et al. |
| 2012/0022824 A1 | 1/2012 | Chino |
| 2012/0232832 A1 | 9/2012 | Zhang et al. |
| 2016/0295435 A1 | 10/2016 | Baroudi et al. |
| 2016/0374167 A1 | 12/2016 | Aliakseyeu et al. |

FOREIGN PATENT DOCUMENTS

| | | |
|---|---|---|
| EP | 2291928 A1 | 3/2011 |
| EP | 3017659 A1 | 5/2016 |
| JP | 09-026948 A | 1/1997 |
| JP | 11-256246 A | 9/1999 |
| JP | 2009-186213 A | 8/2009 |
| JP | 2011-526116 A | 9/2011 |
| JP | 2012-026825 A | 2/2012 |
| JP | 2016-534488 A | 11/2016 |
| KR | 10-2010-0001678 A | 1/2010 |
| RU | 2016103102 A | 8/2017 |
| WO | 2009/157624 A1 | 12/2009 |
| WO | 2015/001472 A | 1/2015 |

OTHER PUBLICATIONS

International Search Report and Written Opinion of PCT Application No. PCT/JP2018/026706, dated Aug. 21, 2018, 09 pages of ISRWO.

\* cited by examiner

FIG. 10
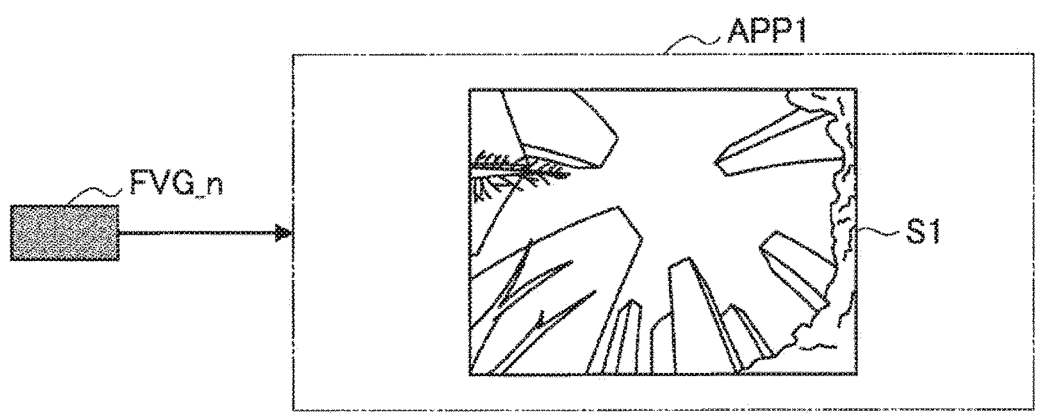
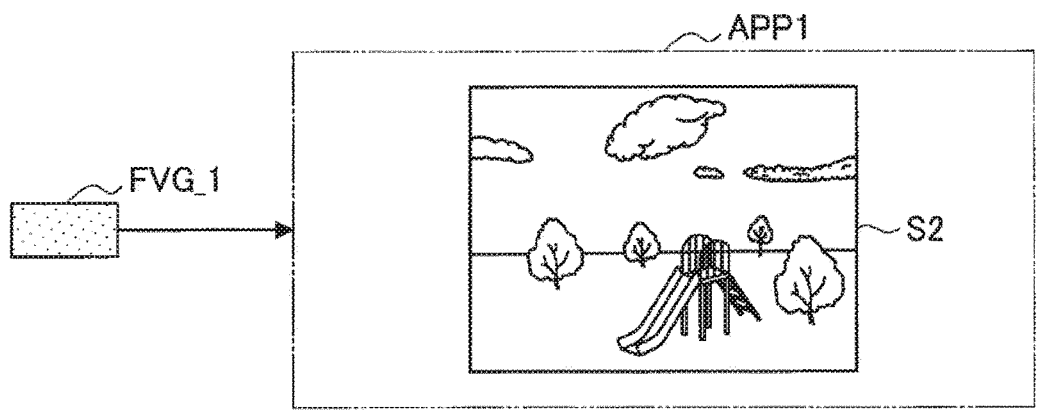

FIG. 11
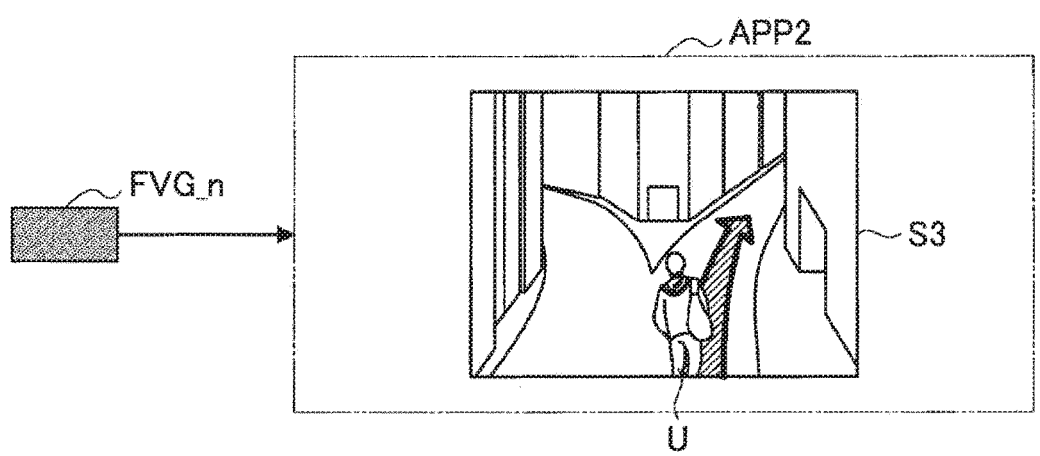
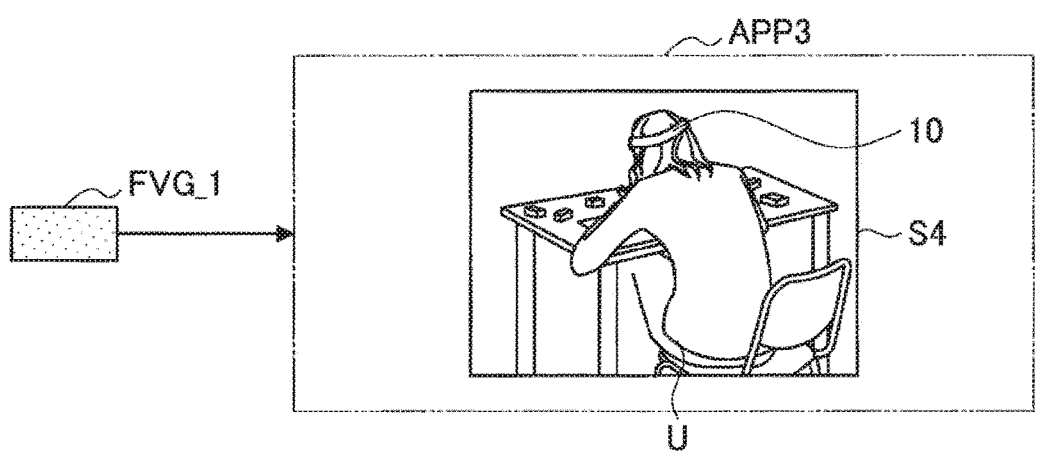

FIG. 13

| Total Number | Number in Cluster (M) | Number of Steps (S) | $M^S$ | Noise method 1 | Noise method 2 |
|---|---|---|---|---|---|
| 4 | 2 | 2 | $2^2$ | $\frac{1}{\sqrt{aN}}$ | $\frac{1}{\sqrt{a^2 N}}$ |
| 8 | 2 | 3 | $2^3$ | $\frac{1}{\sqrt{aN}}$ | $\frac{1}{\sqrt{a^3 N}}$ |
| 9 | 3 | 2 | $3^2$ | $\frac{1}{\sqrt{aN}}$ | $\frac{1}{\sqrt{a^2 N}}$ |
| 16 | 2 | 4 | $2^4$ | $\frac{1}{\sqrt{aN}}$ | $\frac{1}{\sqrt{a^4 N}}$ |
| 16 | 4 | 2 | $4^2$ | $\frac{1}{\sqrt{aN}}$ | $\frac{1}{\sqrt{a^2 N}}$ |
| 25 | 5 | 2 | $5^2$ | $\frac{1}{\sqrt{aN}}$ | $\frac{1}{\sqrt{a^2 N}}$ |

FIG. 17

| | ARW (deg/√h) | Improvement Factor of ARW | Bias Stability (deg/h) | Improvement Factor of BS |
|---|---|---|---|---|
| Gyro 1 | 11.90 | Mathematical average of N=8 gyros =11.95 | 87.1 | Mathematical average of N=8 gyros =102.1 |
| Gyro 2 | 12.02 | | 110.3 | |
| Gyro 3 | 11.98 | | 112.8 | |
| Gyro 4 | 12.05 | | 111.3 | |
| Gyro 5 | 11.89 | | 96.3 | |
| Gyro 6 | 11.83 | | 105.8 | |
| Gyro 7 | 12.09 | | 103.3 | |
| Gyro 8 | 11.80 | | 90.1 | |
| Mean | 4.21 | 2.84 ($\sqrt{N} = \sqrt{8} = 2.83$) | 34.1 | 2.99 ($\sqrt{N} = \sqrt{8} = 2.83$) |
| Method 1 | 2.98 | 4.01 ($\sqrt{2*N} = \sqrt{2*8} = 4.00$) | 24.1 | 4.24 ($\sqrt{2*N} = \sqrt{2*8} = 4.00$) |
| Method 2 | 1.49 | 8.02 ($\sqrt{2^3*N} = \sqrt{8*8} = 8.00$) | 12.1 | 8.44 ($\sqrt{2^3*N} = \sqrt{8*8} = 8.00$) |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/026706 filed on Jul. 17, 2018, which claims priority benefit of Japanese Patent Application No. JP 2017-198314 filed in the Japan Patent Office on Oct. 12, 2017. Each of the above-referenced applications is hereby incorporated herein by reference in its entirety.

TECHNICAL FIELD

The present disclosure relates to an information processing device, an information processing method, and a program.

BACKGROUND ART

In recent years, devices and applications using inertial sensors are widely used. Furthermore, there are many proposed technologies that reduce noise of the inertial sensors. For example, Patent Document 1 discloses a configuration that facilitates removal of beat noise in a gyro sensor unit including a plurality of gyro sensors.

CITATION LIST

Patent Document

Patent Document 1: Japanese Patent Application Laid-Open No. 2009-186213

SUMMARY OF THE INVENTION

Problems to be Solved by the Invention

However, Patent Document 1 discloses a technique of improving redundancy of a gyro unit sensor, and it is also assumed that a load at the time of design is increased.

Accordingly, the present disclosure proposes an information processing device, an information processing method, and a program which are novel, more improved, and capable of easily and more accurately acquiring output signals relating to a plurality of inertial sensors.

Solutions to Problems

According to the present disclosure, provided is an information processing device including a combining unit that stepwisely combines output signals relating to a plurality of inertial sensors, in which the combining unit clusters a plurality of the output signals into a plurality of clusters and stepwisely combines the output signals in each of the clusters, and at least one of the clusters includes a plurality of the output signals.

Furthermore, according to the present disclosure, provided is an information processing method including stepwisely combining, by a processor, output signals relating to a plurality of inertial sensors, in which the combining further includes clustering a plurality of the output signals into a plurality of clusters and stepwisely combining the output signals in each of the clusters, and at least one of the clusters includes a plurality of the output signals.

Moreover, according to the present disclosure, provided is a program that causes a computer to function as an information processing device including a combining unit that stepwisely combines output signals relating to a plurality of inertial sensors, in which the combining unit clusters a plurality of the output signals into a plurality of clusters and stepwisely combines the output signals in each of the clusters, and at least one of the clusters includes a plurality of the output signals.

Effects of the Invention

As described above, according to the present disclosure, it is possible to easily and more accurately acquire output signals relating to a plurality of inertial sensors.

Note that the above-described effect is not necessarily limited, and any effect described in the present specification or another effect that can be grasped from the present specification may also be provided in addition to the above-described effect or instead of the above-described effect.

BRIEF DESCRIPTION OF DRAWINGS

FIG. 10 is a diagram to describe allowable accuracy setting based on an environmental state according to the embodiment.

FIG. 11 is a view to describe allowable accuracy setting based on characteristics of an application and a user state according to the embodiment.

FIG. 13 is a diagram to describe a total noise improvement factor in a case of changing the number of inertial sensors, the number of output signals in a cluster, and the number of steps, according to the embodiment.

FIG. 17 is a diagram illustrating improvement factors of angle random walk (ARW) and bias stability in a simulation at the time of combining eight gyro sensors, according to the embodiment.

MODE FOR CARRYING OUT THE INVENTION

Figure 1:
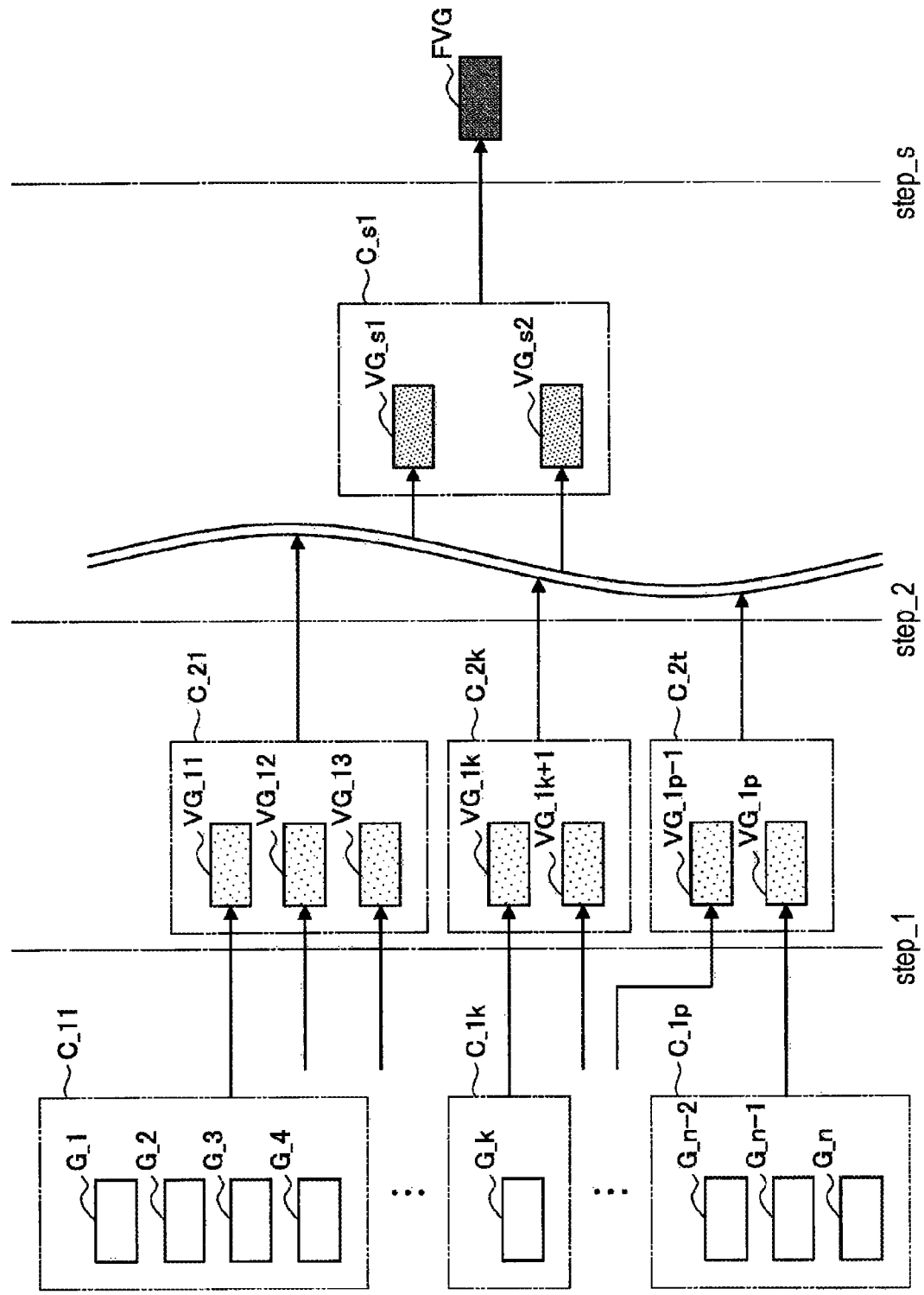
FIG. 1 is a diagram to describe an outline according to an embodiment of the present disclosure.

In the following, preferred embodiments of the present disclosure will be described in detail with reference to the accompanying drawings. Note that, in the present specification and the drawings, constituent elements having substantially the same functional configuration will be denoted by the same reference sign, and the same description will not be repeated.

Note that the description will be provided in the following order.

1. First Embodiment
   1.1. Outline
   1.2. Exemplary System Configuration
   1.3. Exemplary Functional Configurations of Sensor Terminal
   1.4. Exemplary Functional Configurations of Information Processing Device 20
   1.5. Details of Combining Processing
   1.6. Combining Control Based on Usage
   1.7. Effects
2. Exemplary Hardware Configuration
3. Conclusion

1. First Embodiment

<<1.1. Outline>>

In recent years, devices and applications utilizing inertial sensors are widely used. The inertial sensors described above include, for example, a gyro sensor (also referred to as a gyroscope), an acceleration sensor, and the like. Furthermore, there are also various kinds of gyro sensors and acceleration sensors. For example, the gyro sensors include a micro electro mechanical systems (MEMS) gyro sensor using a semiconductor manufacturing technology, an optical gyro sensor, a quantum gyro sensor, and the like.

The optical gyro sensor and the quantum gyro sensor are highly-accurate but are expensive, and therefore, the inexpensive MEMS gyro sensor is often used in a product for general consumers. However, each MEMS gyro sensor has individual accuracy that tends to be varied largely, and therefore, when a single MEMS gyro sensor is used, it is assumed that there may be a case where sufficient accuracy cannot be obtained for usage.

To improve the above-described point, for example, there is a proposed technique that improves accuracy of a detected angular velocity by combining output signals from a plurality of MEMS gyro sensors. In the above technique, it is possible to reduce noise included in an output signal by combining the output signals relating to the plurality of MEMS gyro sensors by batch processing. According to this technique, the detection accuracy of the angular velocity can be effectively improved while using inexpensive MEMS gyro sensors.

However, a noise improvement factor in the above technique is proportional to $\sqrt{N}$ (N is the number of gyro sensors). Therefore, for example, one hundred gyro sensors are required to reduce an order of magnitude of the noise. Furthermore, there is a reported technique that achieves an improvement factor around $\sqrt{2N}$, but it can be hardly said that a sufficient improvement factor is obtained.

Furthermore, since increasing the number of gyro sensors leads to upsizing of the device, the usage is limited and, at the same time, a processing speed and power consumption are also increased.

A technical idea according to the present disclosure is conceived by focusing on the above-described points, and enables easy and more accurate acquisition of output signals relating to a plurality of inertial sensors. To achieve this, an information processing device, an information processing method, and a program according to an embodiment of the present disclosure has one of features in which the output signals relating to the plurality of inertial sensors are stepwisely combined. At this time, the information processing device, the information processing method, and the program according to the embodiment of the present disclosure may cluster the plurality of output signals into a plurality of clusters and stepwisely combines the above-described output signals in each of the clusters. Furthermore, at least one of the above clusters may include a plurality of output signals.

FIG. 1 is a diagram to describe an outline of the embodiment of the present disclosure. FIG. 1 illustrates an exemplary case in which the information processing device according to the present embodiment combines N gyro sensors G_1 to G_n.

As described above, the information processing device according to the present embodiment has one of the features in which the output signals relating to the plurality of inertial sensors are stepwisely combined. In the exemplary case illustrated in FIG. 1, the information processing device according to the present embodiment stepwisely combines output signals relating to the N gyro sensors G_1 to G_n in S times of steps.

At this time, the information processing device according to the present embodiment defines a plurality of clusters in each step, and executes combining of the output signals in each of the clusters. For example, in step_1, the information processing device forms a plurality of clusters of: a cluster C_11 including four gyro sensors G_1 to G_4; a cluster C_1k including one gyro sensor G_k; and a cluster C_1p including three gyro sensors G_n−2 to G_n, and combines output signals in each of the clusters. As illustrated in FIG. 1, the number of output signals included in a cluster according to the present embodiment may be different in each cluster.

Subsequently, the information processing device further clusters, in step_2, combined output signals (hereinafter also referred to as combined gyros) combined in step_1, and further combines the combined gyros in each of the clusters.

In the exemplary case illustrated in FIG. 1, the information processing device further executes, in step_1, the combining in each of: a cluster_21 including a combined gyro VG_11 relating to the cluster C_11; a cluster_2k including a combined gyro VG_1k relating to the cluster C_1k; and a cluster_2t including a combined gyro VG_1p relating to the cluster C_1p.

Thus, the information processing device according to the present embodiment repeatedly executes, in each step, the clustering and the combining. In the exemplary case illustrated in FIG. 1, the information processing device executes, in step_S, the combining relating to a cluster C_s1 including combined gyros VG_s1 and VG_s2, and outputs a final output signal FVG.

As described above, the information processing device according to the present embodiment has one of the features in which the output signals relating to the plurality of inertial sensors are stepwisely combined. According to this technique, it is possible to achieve an improvement factor exceeding $\sqrt{N}$ or $\sqrt{2N}$ in the above-described report. Note that details of the improvement factor achieved by the technical idea according to the present embodiment will be separately described.

<<1.2. System Exemplary Configuration>>

Figure 2:
FIG. 2 is a block diagram illustrating an exemplary configuration of an information processing system according to the embodiment.

Next, an exemplary configuration of an information processing system according to the embodiment of the present disclosure will be described. FIG. 2 is a block diagram illustrating the exemplary configuration of the information processing system according to the present embodiment. Referring to FIG. 1, the information processing system according to the present embodiment includes a sensor terminal 10 and an information processing device 20. Furthermore, the sensor terminal 10 and the information processing device 20 are connected via a network 30 for mutual communication.

(Sensor Terminal 10)

The sensor terminal 10 according to the present embodiment includes an information processing device including a plurality of inertial sensors. The sensor terminal according to the present embodiment transmits output signals of the plurality of inertial sensors to the information processing device 20. Furthermore, the sensor terminal 10 according to the present embodiment may receive a final output signal obtained from the combining by the information processing device 20, and use the final output signal in a compatible application.

The sensor terminal 10 according to the present embodiment may include, for example, a mobile phone, a smartphone, a tablet, or a dedicated device. Furthermore, the sensor terminal 10 according to the present embodiment may include, for example, a wearable device that provides applications using information presentation technologies such as augmented reality (AR), virtual reality (VR), and mixed reality (MR), or the like. Moreover, the sensor terminal 10 according to the present embodiment may include various kinds of vehicles equipped with an automatic driving function, an aircraft body such as a drone, an autonomous mobile robot, and the like.

(Information Processing Device 20)

The information processing device 20 according to the present embodiment has a function of combining the output signals relating to the plurality of inertial sensors received from the sensor terminal 10. The information processing device 20 according to the present embodiment may be implemented as a server, for example.

Furthermore, the information processing device 20 according to the present embodiment may include, for example, a wearable device such as a head-mounted display. In this case, for example, the information processing device 20 combines output signals received from the sensor terminal 10 of a wristwatch type or a dedicated device, and can utilize an acquired final output signal for operation of a compatible application.

(Network 30)

The network 30 has a function of connecting the sensor terminal 10 and the information processing device 20. The network 30 may include: public line networks such as the Internet, a telephone line network, and a satellite communication network; various kinds of networks including the Ethernet (registered trademark), such as a local area network (LAN) and a wide area network (WAN); and the like. Furthermore, the network 30 may include a dedicated line network such as an internet protocol-virtual private network (IP-VPN). Additionally, the network 30 may include a wireless communication network such as Wi-Fi (registered trademark) and Bluetooth (registered trademark).

In the above, the exemplary configuration of the information processing system according to the present embodiment has been described. Note that the above configuration described using FIG. 2 is merely an example, and the configuration of the information processing system according to the present embodiment is not limited to the example. For example, the functions included in the sensor terminal 10 and the information processing device 20 according to the present embodiment may be implemented by a single device. The configuration of the information processing system according to the present embodiment can be flexibly modified in accordance specifications and a practical use.

<<1.3. Exemplary Functional Configurations of Sensor Terminal>>

Figure 3:
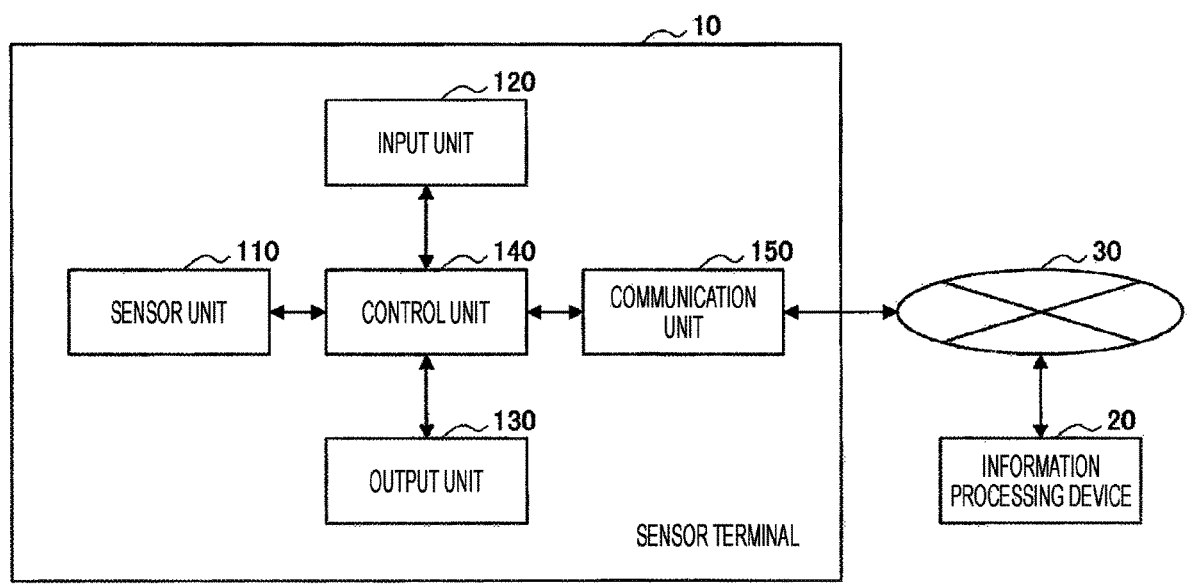
FIG. 3 is a block diagram illustrating exemplary functional configurations of a sensor terminal according to the embodiment.

Next, exemplary functional configurations of the sensor terminal 10 according to the present embodiment will be described. FIG. 3 is a block diagram illustrating exemplary functional configurations of the sensor terminal 10 according to the present embodiment. Referring to FIG. 3, the sensor terminal 10 according to the present embodiment includes a sensor unit 110, an input unit 120, an output unit 130, a control unit 140, and a communication unit 150.

(Sensor Unit 110)

The sensor unit 110 according to the present embodiment includes a plurality of inertial sensors. The sensor unit 110 according to the present embodiment may include at least three inertial sensors or more. As described above, the inertial sensors according to the present embodiment include a gyro sensor and an acceleration sensor. Furthermore, the gyro sensor includes a wide range of gyro sensors such as a mechanical gyro sensor, an optical gyro sensor, a quantum gyro sensor, and the like in addition to the MEMS gyro sensor. Note that, in the following description, an exemplary case of combining output signals of MEMS gyro sensors as the exemplary inertial sensors according to the present embodiment will be described.

Furthermore, the sensor unit 110 according to the present embodiment may include various kinds of sensors besides the inertial sensors which are targets of the combining. For the above-described sensors, a gyro sensor, an acceleration sensor, a geomagnetic sensor, an imaging element, and a global navigation satellite system (GNSS) signal receiver, and the like may be exemplified.

(Input Unit 120)

The input unit 120 according to the present embodiment has a function of detecting input operation by a user. To implement this function, the input unit 120 according to the present embodiment includes a keyboard, various kinds of buttons, a touch panel, and the like. Furthermore, voice input may also be included in the above input. In this case, the input unit 120 according to the present embodiment further includes a microphone to collect sound information.

(Output Unit 130)

The output unit 130 according to the present embodiment has a function of providing a user with visual information and auditory information on the basis of control by the control unit 140. To implement this function, the output unit 130 according to the present embodiment includes a display device that presents the visual information. Examples of the above display device may include a liquid crystal display (LCD) device, an organic light emitting diode (OLED) device, a touch panel, and the like. Furthermore, the output unit 130 according to the present embodiment includes a speaker, an amplifier, and the like to output the auditory information.

(Control Unit 140)

The control unit 140 according to the present embodiment, the control unit 140 according to the present embodiment has a function of controlling the respective configurations included in the sensor terminal 10. For example, the control unit 140 controls activation and stop of the respective configurations.

Furthermore, the control unit 140 controls operation of an application utilizing a final output signal obtained from the combining by the information processing device 20. The above-described application may include a function utilizing, for example: various kinds of tracking/guidance technologies including pedestrian dead reckoning (PDR); and information presentation technologies such as AR, VR, and MR. Furthermore, the above-described application may have various kinds of functions utilizing, for example, a vehicle automated driving technology, and a dynamic body control technology for an aircraft body including a drone, an autonomous mobile robot, and the like.

(Communication Unit 150)

The communication unit 150 according to the present embodiment has a function of performing information communication with the information processing device 20 via the network 30. Specifically, the communication unit 150 transmits, to the information processing device 20: output signals of the inertial sensors included in the sensor unit 110; and sensor information acquired by another sensor. Furthermore, the communication unit 150 receives the final output signal obtained from the combining by the information processing device 20.

In the above, the exemplary functional configurations of the sensor terminal 10 according to the present embodiment have been described. Note that the above-described configurations described using FIG. 3 are merely examples, and the functional configurations of the sensor terminal 10 according to the present embodiment are not limited to the examples. For example, the sensor terminal 10 according to the present embodiment may not necessarily include all of the configurations illustrated in FIG. 3. Furthermore, the sensor terminal 10 may include functions of, for example, a combining unit 210 and a processing control unit 220 of the information processing device 20 as described later. The functional configurations of the sensor terminal 10 according to the present embodiment can be flexibly modified in accordance with the specifications and the practical use.

<<1.4. Exemplary Functional Configurations of Information Processing Device 20>>

Figure 4:
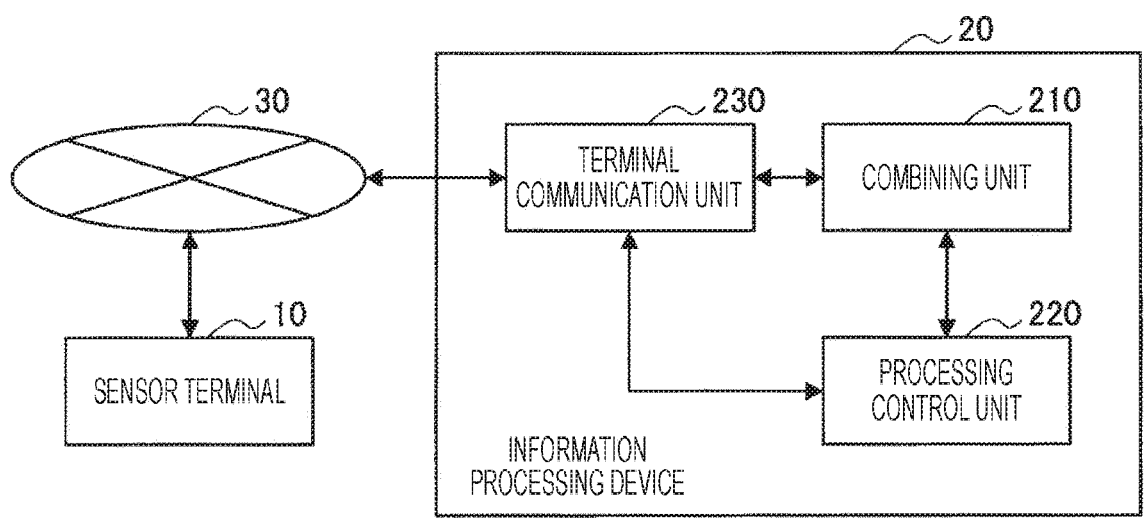
FIG. 4 is a block diagram illustrating exemplary functional configurations of an information processing device according to the embodiment.

Next, exemplary functional configurations of the information processing device 20 according to the present embodiment will be described. FIG. 4 is a block diagram illustrating the exemplary functional configurations of the information processing device 20 according to the present embodiment. Referring to FIG. 4, the information processing device 20 according to the present embodiment includes the combining unit 210, the processing control unit 220, and a terminal communication unit 230.

(Combining Unit 210)

The combining unit 210 according to the present embodiment has a function of combining output signals relating to the plurality of inertial sensors included in the sensor terminal 10. At this time, the combining unit 210 according to the present embodiment has one of features in which the combining unit 210 clusters the plurality of output signals into a plurality of clusters and stepwisely combines the output signals in each of the clusters.

Note that at least one of the clusters includes a plurality of output signals, but as described above, the number of output signals included in a cluster may be different in each cluster. The combining unit 210 according to the present embodiment can determine, for each of the clusters, the number of output signals (combined gyros) included in each of the clusters in the same step level.

More specifically, the combining unit 210 according to the present embodiment can acquire a highly-accurate final output signal by: further clustering the output signals combined in each of the clusters, namely, combined gyros; and repeatedly executing the combining of output signals in each of the clusters.

Furthermore, the combining unit 210 according to the present embodiment may dynamically determine the number of step levels relating to the combining of the output signals and the number of output signals (combined gyros) included in each of the clusters. At this time, the combining unit 210 according to the present embodiment can implement the above-described processing by using, for example, a machine learning technique such as Deep Learing.

(Processing Control Unit 220)

The processing control unit 220 according to the present embodiment has a function of controlling, on the basis of usage of a final output signal, the combining processing of output signals by the combining unit 210. For example, the processing control unit 220 according to the present embodiment may control the combining of the output signals by the combining unit 210 in accordance with characteristics of an application that uses the final output signal.

Furthermore, the processing control unit 220 according to the present embodiment may control the combining of the output signals by the combining unit 210 on the basis of an environmental state or a user state estimated on the basis of sensor information acquired by the sensor terminal 10. The above-described sensor information includes, for example, acceleration information, geomagnetic information, image information, and the like. The details of the functions included in the processing control unit 220 according to the present embodiment will be separately as described later.

(Terminal Communication Unit 230)

The terminal communication unit 230 according to the present embodiment has a function of performing information communication with the sensor terminal 10 via the network 30. Specifically, the terminal communication unit 230 receives, from the sensor terminal 10, the output signals of the inertial sensors and the sensor information relating to another sensor. Furthermore, the terminal communication unit 230 transmits, to the sensor terminal 10, a final output signal obtained from the combining by the combining unit 210.

In the above, the exemplary functional configurations of the information processing device 20 according to the present embodiment have been described. Note that the above-described functional configurations described using FIG. 4 are merely examples, and the functional configurations of the information processing device 20 according to the present embodiment are not limited to the examples. As described above, the functions included in the combining unit 210 and the processing control unit 220 according to the present embodiment may also be implemented as functions included in the sensor terminal 10. In this case, the sensor terminal 10 and the information processing device 20 can be implemented as a single device. On the other hand, in a case where the combining processing of the output signals is implemented by the information processing device 20, a processing load on the sensor terminal 10 can be effectively reduced. The functional configurations of the information processing device 20 according to the present embodiment can be flexibly modified in accordance with the specifications and the practical use.

<<1.5. Details of Combining Processing>>

Next, the combining processing of output signals by the combining unit 210 according to the present embodiment will be described in detail. As described above, the combining unit 210 according to the present embodiment enables acquisition of a highly-accurate final output signal by stepwisely executing the clustering and combining of the output signals.

Figure 5:
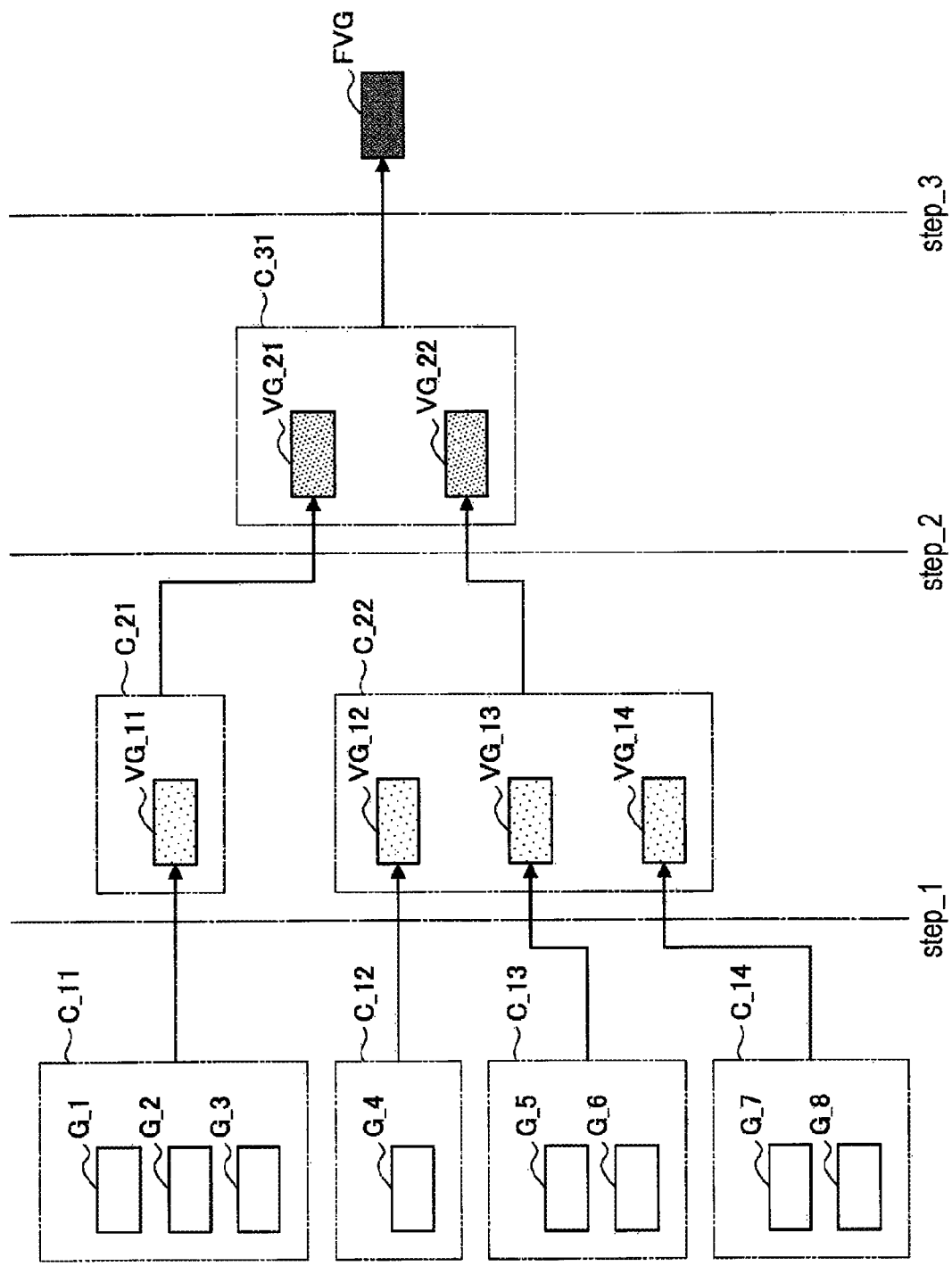
FIG. 5 is a diagram illustrating an example of the combining processing of output signals according to the embodiment.

Here, the above-described combining processing by the combining unit 210 will be described while using specific examples. FIG. 5 is a diagram illustrating an example of combining processing of output signals according to the present embodiment. In the exemplary case illustrated in FIG. 5, the combining unit 210 combines output signals relating to eight gyro sensors $G\_1$ to $G\_8$ in three step levels to acquire a final output signal FVG.

Specifically, in step $S\_1$, the combining unit 210 generates a cluster $C\_11$ including gyro sensors $G\_1$ to $G\_3$, a cluster $C\_12$ including gyro sensors $G\_4$, a cluster $C\_13$ including gyro sensors $G\_5$ and $G\_6$, and a cluster $C\_14$ including gyro sensors $G\_7$ and $G\_8$, and combines output signals in each of the clusters.

Furthermore, in step $S\_2$, the combining unit 210 generates a cluster $C\_21$ including a combined gyro $VG\_11$ relating to the cluster $C\_11$, and a cluster $C\_22$ including combined gyros $VG\_12$ to $VG\_14$ relating to the clusters $C\_12$ to $C\_14$, and executes further combining in each of the clusters.

Furthermore, in step $S\_3$, the combining unit 210 generates a cluster $C\_31$ including a combined gyro $VG\_21$ relating to the cluster $C\_21$ and a combined gyro $VG\_22$ relating to the cluster $C\_22$, and acquires a final output signal FVG.

Thus, the number of output signals (combined gyros) included in a cluster according to the present embodiment may be different from the number of output signals included in another cluster in the same step. In the present embodiment, the combining unit 210 can dynamically control the clustering and the number of steps such that a final output signal with higher accuracy can be obtained.

Figure 6:
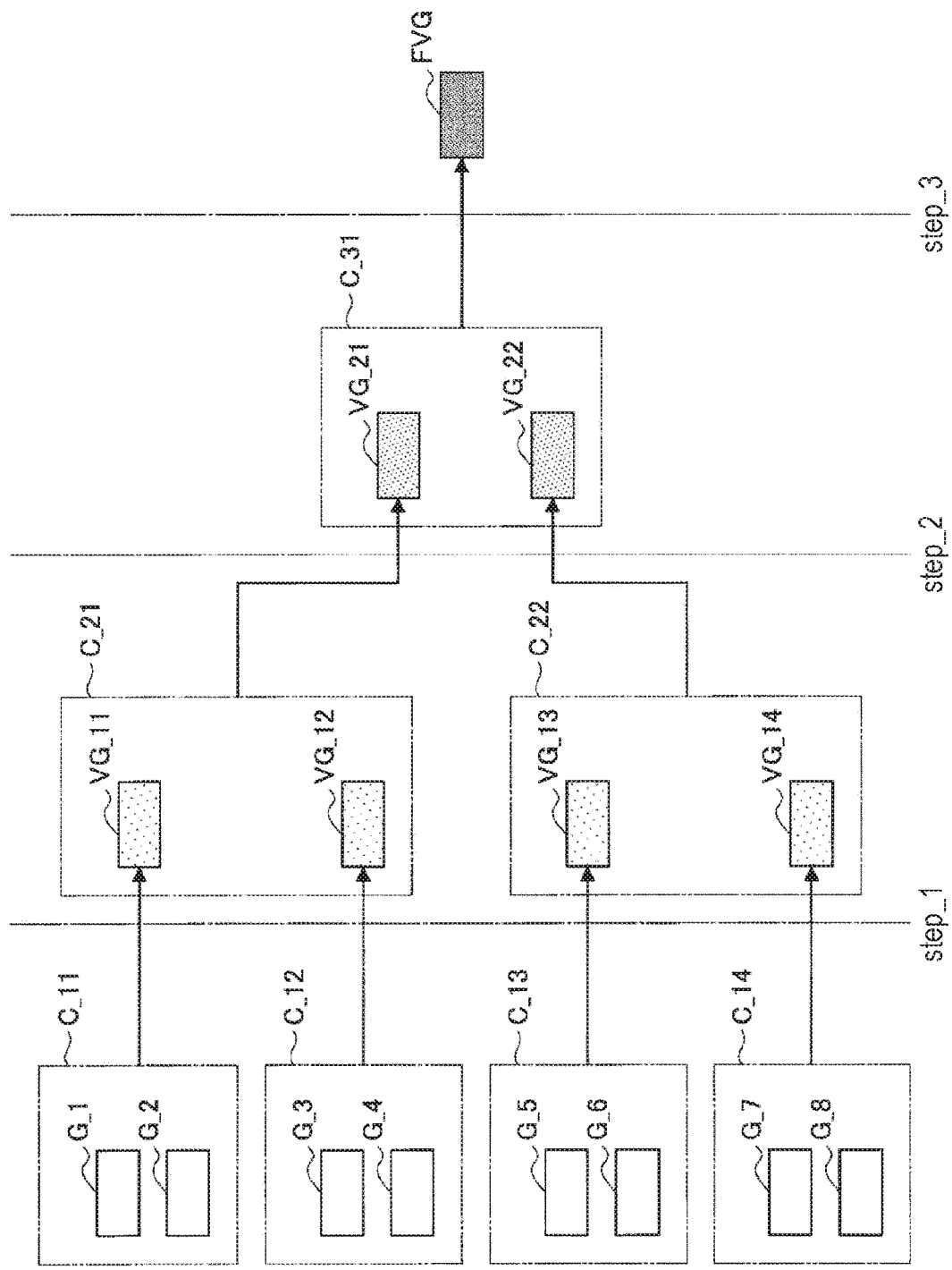
FIG. 6 is a diagram illustrating an example of the combining processing of the output signals according to the embodiment.

On the other hand, the number of output signals (combined gyros) included in a cluster according to the present embodiment may be constant in each step. FIG. 6 is a diagram illustrating an example of the combining processing of the output signals according to the present embodiment. In the example illustrated in FIG. 6, similar to the example illustrated in FIG. 5, the combining unit 210 combines output signals relating to the eight gyro sensors $G\_1$ to $G\_8$ in three step levels, and acquires a final output signal FVG.

On the other hand, in the exemplary case illustrated in FIG. 6, the combining unit 210 sets, in common, the number of output signals (combined gyros) included in a cluster in each step level. Specifically, the combining unit 210 generates clusters $C\_11$ to $C\_14$ each including two output signals in step_1, and generates clusters $C\_21$ and $C\_22$ each including two combined gyros in step_2. Furthermore, in step_3, the combining unit 210 generates a cluster $C\_31$ including two combined gyros and acquires a final output signal FVG.

Furthermore, in the present embodiment, the combining unit 210 can dynamically determine combinations of output signals (combined gyros) included in each cluster. In such case, the combining unit 210 according to the present embodiment can determine the combinations by which it is possible to acquire a final output signal with higher accuracy by using the machine learning technique such as the Deep Learing.

Figure 7:
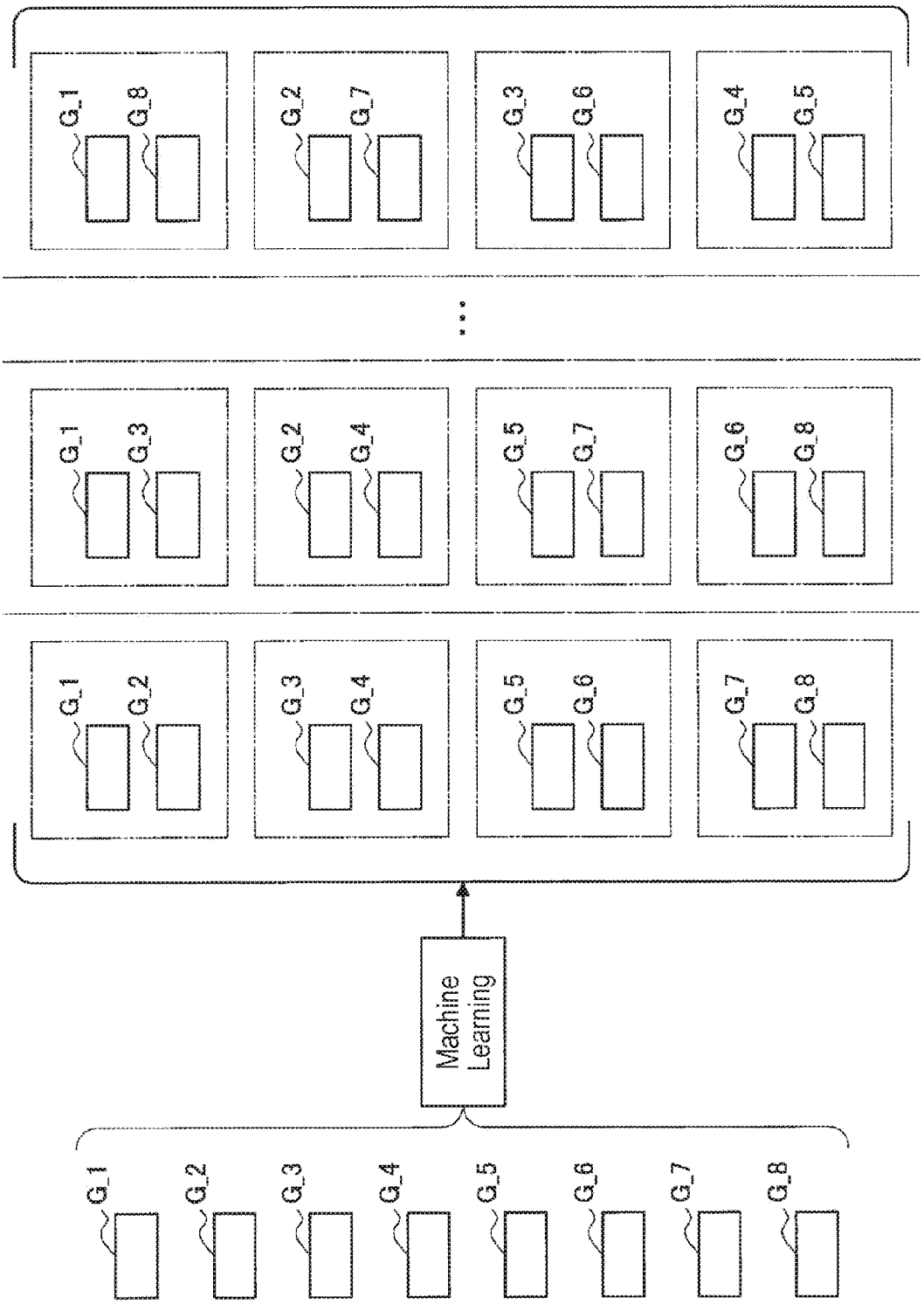
FIG. 7 is a diagram to describe combinations of output signals included in clusters according to the embodiment.

FIG. 7 is a diagram to describe combinations of output signals included in clusters according to the present embodiment. FIG. 7 illustrates the combinations which respective clusters may have in a case of generating, from the eight gyro sensors $G\_1$ to $G\_8$, four clusters each including two gyro sensors.

At this time, the number of combinations of the gyro sensors $G\_1$ to $G\_8$ included in each cluster is $8C2=8!/(8-2)!*2!$, that is, twenty-eight combinations. The combining unit 210 according to the present embodiment can obtain a final output signal with higher accuracy by obtaining an optimal solution relating to the above combinations by using the machine learning technique.

Figure 8:
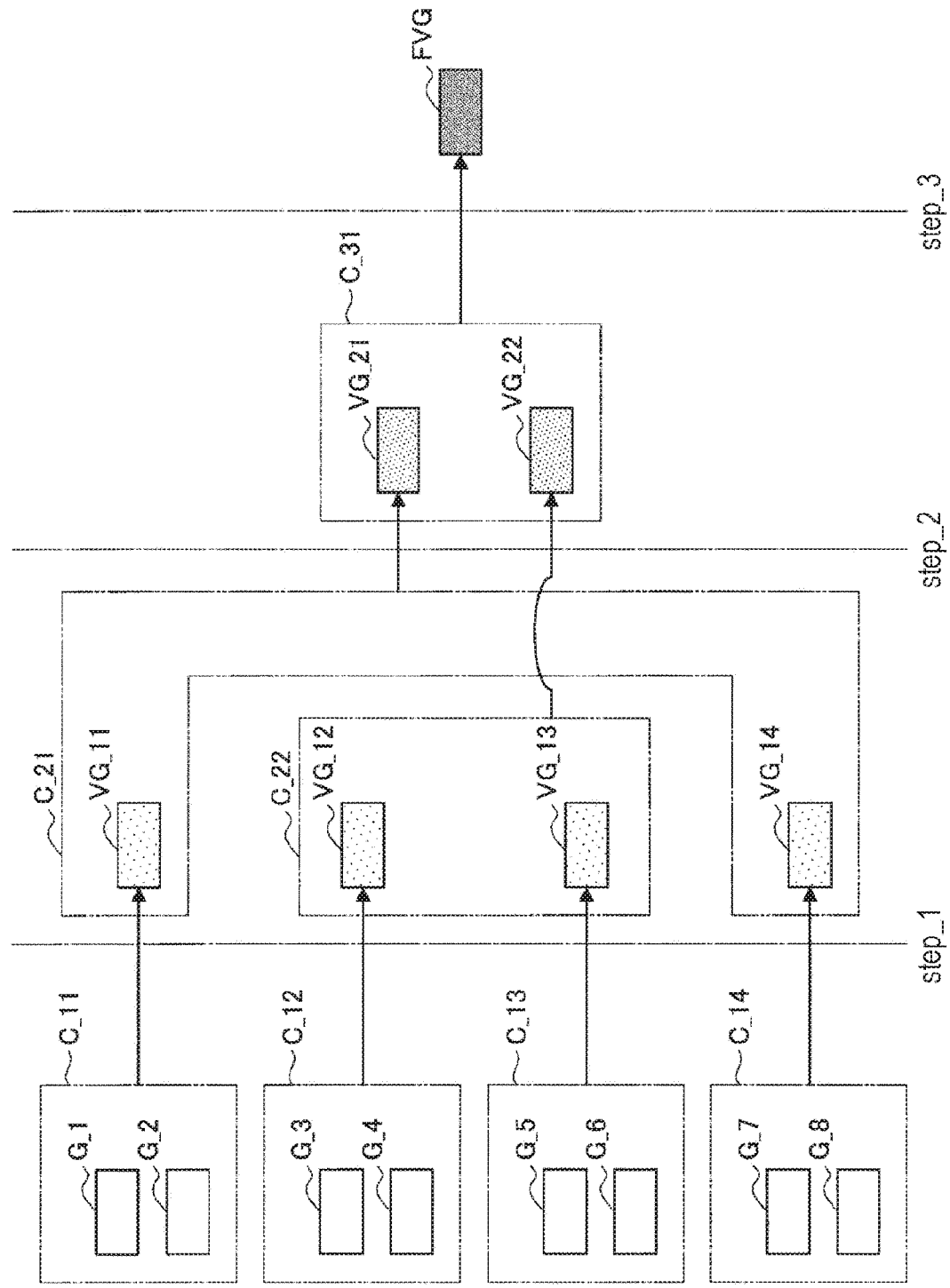
FIG. 8 is a diagram to describe dynamic control for clustering according to the embodiment.

FIG. 8 is a diagram to describe dynamic control for clustering according to the present embodiment. FIG. 8 illustrates an exemplary case in which the combining unit 210 combines output signals while using the same number of gyro sensors and the same number of steps as those in the case of FIG. 6. On the other hand, different from the example of FIG. 6, the combining unit 210 generates, in step $S\_2$, a cluster $C\_21$ including the combined gyros $VG\_11$ and $VG\_14$ and a cluster $C\_22$ including the combined gyros $VG\_12$ and $VG\_13$, and performs combining of the respective combined gyros in the exemplary case illustrated in FIG. 8.

Thus, the combining unit 210 according to the present embodiment can dynamically change the clustering during the processing, irrespective of a step. According to the above-described functions included in the combining unit 210 according to the present embodiment, for example, even in a case where accuracy of some gyro sensors is changed due to some cause, clustering more suitable for each situation can be performed, and the accuracy of the final output signal can be improved.

Furthermore, for example, in a case where the accuracy of some of the gyro sensors is largely degraded, the combining unit 210 may not use output signals of such gyro sensors in the clustering or combining. According to the above-described functions included in the combining unit 210, the accuracy of the acquired final output signal can be improved by excluding, from the combining processing, the output signals having low accuracy.

<<1.6. Combining Control Based on Usage>>

Next, combining control based on usage of an output signal according to the present embodiment will be described in detail. As described above, the processing control unit 220 according to the present embodiment can control, on the basis of the usage of the output signals, the combining of output signals by the combining unit 210.

The processing control unit 220 according to the present embodiment may control the combining processing performed by the combining unit 210 on the basis of, for example, characteristics of an application that uses a final output signal, and an environmental state or a user state estimated on the basis of the sensor information.

More specifically, the processing control unit 220 according to the present embodiment may control the combining processing by the combining unit 210 on the basis of allowable accuracy relating to an output signal. Here, the above-described allowable accuracy represents a threshold value of accuracy that can be allowed in an application that uses a final output signal after the combining.

Figure 9:
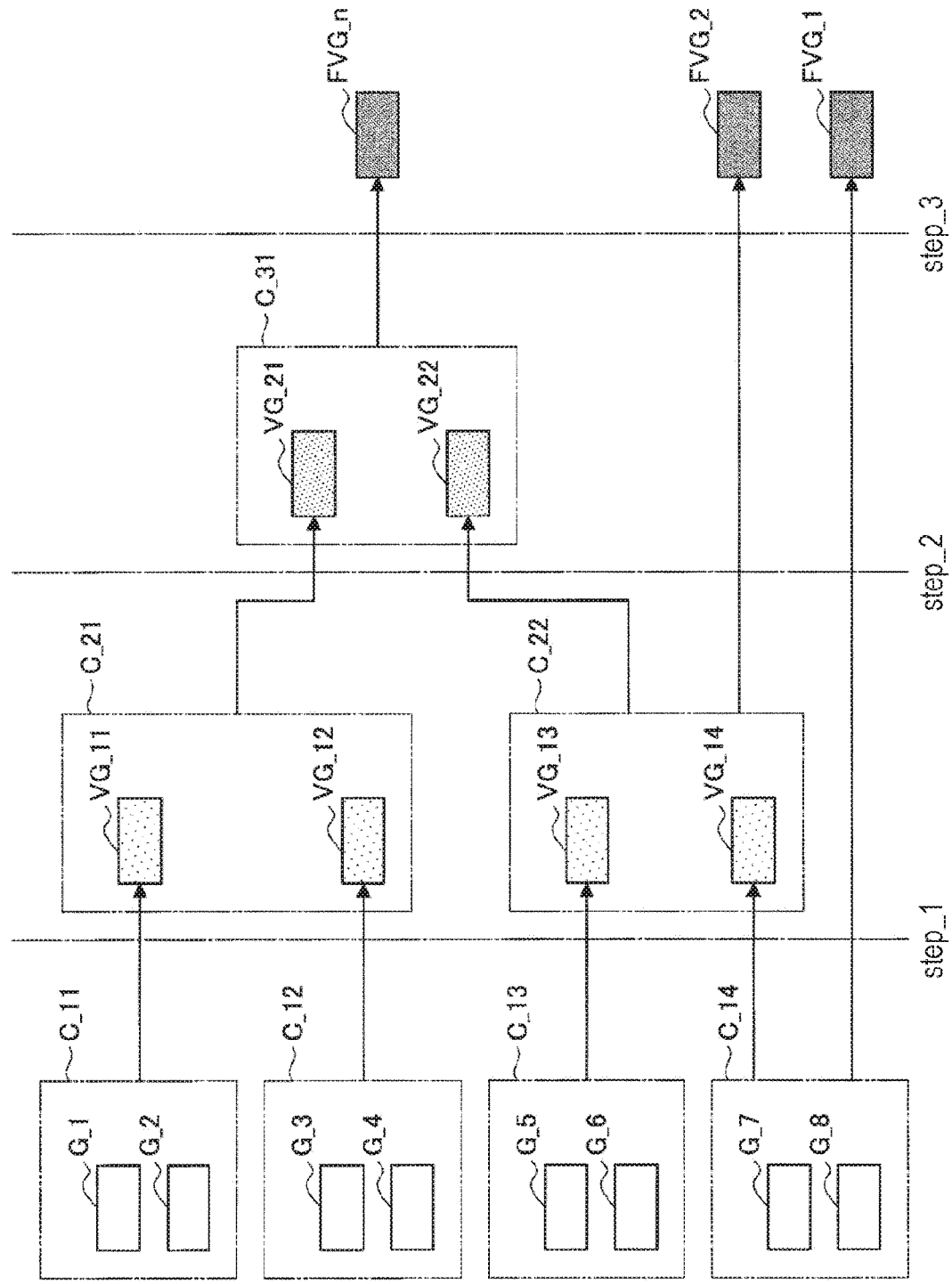
FIG. 9 is a diagram to describe the combining processing of the output signals in accordance with usage, according to the embodiment.

FIG. 9 is a diagram to describe the combining processing of output signals embodiment in accordance with the usage, according to the present embodiment. FIG. 9 illustrates an exemplary case in which the combining unit 210 performs the clustering and the combining processing similar to the case illustrated in FIG. 6.

In such case, at the time when the accuracy of an output signal (combined gyro) satisfies the allowable accuracy in the combining processing relating to each of clusters in each step, the processing control unit 220 according to the present embodiment passes the output signal to an application compatible with the allowable accuracy.

In the exemplary case illustrated in FIG. 9, for example, in a case where accuracy of an output signal satisfies allowable accuracy of a certain application by the combining processing relating to the cluster C_14 in step S_1, the processing control unit 220 passes the output signal to the application as a final output signal FVG_1.

Furthermore, similarly, in a case where accuracy of an output signal satisfies the allowable accuracy of the application by performing the combining processing relating to a cluster C_22 in step S_2, the processing control unit 220 may pass the output signal to the application as a final output signal FVG_2.

Furthermore, in a case where accuracy of an output signal satisfies the allowable accuracy of the application by performing the combining processing relating to the cluster C_31 in step S_3, the processing control unit 220 passes the output signal to the application as a final output signal FVG_n.

Thus, at the time when accuracy of an output signal satisfies the allowable accuracy in the combining processing, the processing control unit 220 according to the present embodiment can pass the output signal to the application. According to the above-described functions included in the processing control unit 220 according to the present embodiment, a processing time relating to the combining of output signals can be effectively shortened, and a response with less delay can be achieved.

Furthermore, in the case where an output signal satisfies the allowable accuracy, the processing control unit 220 according to the present embodiment may terminate the combining processing of output signals performed by the combining unit 210. According to the above-described functions included in the processing control unit 220 according to the present embodiment, it is possible to shorten the processing time and further reduce a processing load.

Note that the allowable accuracy according to the present embodiment may be set on the basis of, for example, characteristics of an application, an environmental state, a user state, and the like. FIG. 10 is a diagram to describe allowable accuracy setting based on the environmental state.

FIG. 10 illustrates an exemplary case where final output signals corresponding to different levels of allowable accuracy are used in a same application APP1. Here, the application APP1 may include a navigation application utilizing the GNSS or the like, for example.

In such case, the processing control unit 220 according to the present embodiment can set the different levels of allowable accuracy on the basis of the environmental state estimated from the sensor information, and can control the combining processing performed by the combining unit 210.

Specifically, since sensitivity of the GNSS or the like is degraded in an area surrounded by buildings, located indoor, underground, or the like, it is required to use a final output signal with high accuracy in order to maintain navigation accuracy. Therefore, in a case where sensor information S1 acquired by the sensor terminal 10 indicates that the sensitivity of the GNSS is low, the processing control unit 220 according to the present embodiment causes the combining unit 210 to execute the combining processing to a final step, and may pass a final output signal FVG_n with higher accuracy to the application APP1.

On the other hand, since the sensitivity of the GNSS becomes high in an area located outdoor or the like having a good panoramic view, even the final output signal having relatively low accuracy may be allowable. Therefore, in a case where the sensor information S1 acquired by the sensor terminal 10 indicates that the sensitivity of the GNSS is high, the processing control unit 220 according to the present embodiment may pass the final output signal FVG to the application APP1 at the time when a combined output signal satisfies the allowable accuracy. In the exemplary case illustrated in FIG. 10, the processing control unit 220 passes, to the application APP1, the final output signal FVG_1 acquired in the step level of step S_1.

FIG. 11 is a view to describe allowable accuracy setting based on characteristics of an application and a user state. FIG. 11 illustrates an exemplary case in which final output signals corresponding to different levels of allowable accuracy are used in two applications APP2 and APP3. Here, the application APP2 may include, for example, a navigation system using the PDR technology, and the application APP3 may include a VR application used in a situation where user's exercise intensity is relatively low, such as a sitting state, or the like.

In such case, the processing control unit 220 according to the present embodiment sets different levels of allowable accuracy on the basis of the characteristics of each of the applications, the user state estimated from sensor information, and the like, and can control the combining processing performed by the combining unit 210.

Specifically, in the application APP2 relating to the PDR, it is assumed that a user U constantly performs exercise with large motions such as walking, or the like. Therefore, it is required to use a highly-accurate final output signal in order to improve accuracy of information to be provided.

Therefore, the processing control unit 220 according to the present embodiment causes the combining unit 210 to execute the combining processing to the final step on the basis of preset allowable accuracy in accordance with the characteristics of the application APP2 and a level of the exercise intensity of the user U indicated by sensor information S3 acquired by the sensor terminal 10, and then the processing control unit 220 may pass a final output signal FVG_n with higher accuracy to the application APP1.

On the other hand, in the application APP3 used in a situation where the user's exercise intensity is relatively low, there may be a case where even a final output signal having relatively low accuracy is acceptable. Therefore, the processing control unit 220 according to the present embodiment may pass a final output signal FVG to the application APP1 at the time when a combined output signal satisfies allowable accuracy on the basis of the allowable accuracy preset in accordance with the characteristics of the application APP3 and lowness of the exercise intensity of the user U indicated by sensor information S4 acquired by the sensor terminal 10. In the exemplary case illustrated in FIG. 11, the processing control unit 220 passes, to the application APP1, the final output signal FVG_1 obtained in the step S_1.

As described above, according to the processing control unit 220 according to the present embodiment, it is possible to dynamically control the combining processing performed by the combining unit 210 in accordance with the characteristics of each application, the environmental state, and the user state. According to the above-described functions included in the processing control unit 220 according to the present embodiment, more valuable functions can be provided to the user by appropriately selecting priority relating to the accuracy and the processing time in accordance with each situation.

<<1.7. Effects>>

Next, effects provided by the technical idea according to the present embodiment will be described in detail. As described above, in the case of the technique in which output signals relating to a plurality of inertial gyros is combined by batch processing, there is the reported case where the noise improvement factor is √2. Hereinafter, the above-described technique will be defined as a comparison technique in the present embodiment.

Figure 12:
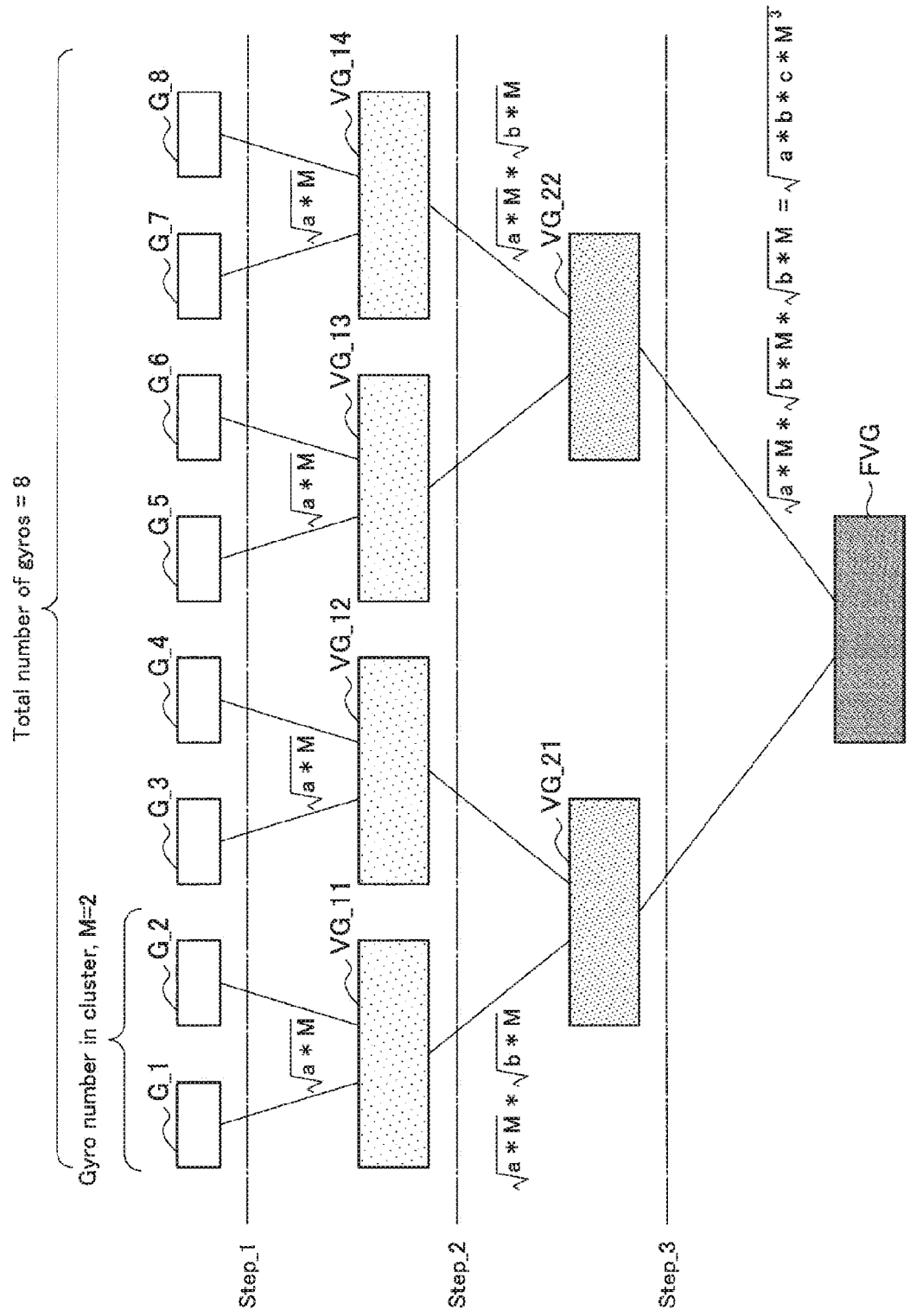
FIG. 12 is a diagram to describe a noise improvement factor according to the embodiment.

Here, a noise improvement factor obtained by the information processing method according to the present embodiment will be studied. FIG. 12 is a diagram to describe a noise improvement factor according to the present embodiment. FIG. 12 illustrates the improvement factor in a case of clustering eight gyro sensors G_1 to G_8 two by two and executing the combining in three steps.

Here, the improvement factor obtained by the combining in step S_1 is defined as a, and the number of output signals included in each of the clusters is defined as M. Then, a total noise improvement factor obtained from combining results in respective clusters in step S_1 can be calculated from √(a*M).

Similarly, assuming that the improvement factor obtained by the combining in step S_2 is defined as b, a total noise improvement factor obtained from combining results of respective classes in step_2 is to be √(a*M)*√(b*M).

Furthermore, assuming that the improvement factor obtained by the combining in step S_3 is defined as c, a total noise improvement factor obtained from combining results of respective classes in step_3 is to be √(a*M)*√(b*M)*√(c*M)=√(a*b*c*M³).

Here, in a case of assuming that a=b=c is satisfied, the above expression can be modified to √(a³*M³). Note that exponents in this expression represent the number of steps. In other words, in a case where the number of steps is defined as S, a total noise improvement factor according to the present embodiment is to be √(a^S*M^S)=√(a^S*N). However, N in the above expression represents the number of inertial sensors.

Next, referring to FIG. 13, a description will be provided for a total noise improvement factor in a case of changing the number of inertial sensors, the number of output signals in a cluster, and the number of steps. In FIG. 13, the total number of inertial sensors, the number of output signals in a cluster (M), the number of steps (S), M^S, and noise (1/total improvement factor) included in a final output signal are provided sequentially from the left. Furthermore, as for the noise, provided are two cases of using the comparison technique (Method 1) and the information processing method (Method 2) according to the present embodiment.

As illustrated in FIG. 13, in the comparison technique, since all of the inertial sensors are combined by batch processing, the improvement factor is constant regardless of the number of inertial sensors. On the other hand, it is found that the total improvement factor obtained by the information processing method according to the present embodiment is increased proportional to the number of steps.

For example, comparing the case where the total number of inertial sensors is eight with the case where the total inertial sensor is nine in FIG. 13, the case where the total number of inertial sensors is eight exhibits the higher total noise improvement factor because of having the large number of steps despite a fact that the total number of inertial sensors is almost the same.

Furthermore, comparing two pieces of data in a case where the total number of inertial sensors is sixteen, it is found that the more increased the number of steps is, the more improved the total improvement factor is and the more effectively the noise is reduced. On the other hand, in the case of reducing the number of steps, the processing time is accelerated, and therefore, the number of steps may be appropriately determined on the basis of the above-described allowable accuracy.

Next, a difference in the improvement factor between the comparison technique and the information processing method according to the present embodiment will be described in detail. For example, in the case where the total number of inertial sensors is eight and, in a case where the improvement factor a in each step is 2, noise of an output signal obtained from the batch processing of the comparison technique is expressed by Expression (1) below. On the other hand, in the case of combining the same number of the inertial sensors by the information processing method according to the present embodiment (M=2 and S=3), noise of a final output signal is expressed by Expression (2) below.

[Math. 1]

$$\frac{1}{\sqrt{aN}} = \frac{1}{\sqrt{2*8}} = \frac{1}{\sqrt{16}} = \frac{1}{4} \quad (1)$$

$$\frac{1}{\sqrt{a^3N}} = \frac{1}{\sqrt{2^3*8}} = \frac{1}{\sqrt{8*8}} = \frac{1}{8} \quad (2)$$

Thus, in the case where the total number of inertial sensors is the same, the noise is reduced to ¼ in the comparison technique, whereas the noise can be reduced to ⅛ in the information processing method according to the present embodiment. In other words, according to the present embodiment, it is possible to reduce an order of magnitude of the noise by using eight to sixteen inertial sensors. On the other hand, fifty inertial sensors are required to reduce an order of magnitude of the noise in the comparison technique, and therefore, it can be said that: an improvement factor 5 times that of the comparison technique can be achieved by the information processing method of the present embodiment.

Furthermore, in a case of combining four inertial sensors by the information processing method according to the present embodiment (M=2 and S=2), noise of a final output signal is expressed by Expression (3) as follows.

[Math. 2]

$$\frac{1}{\sqrt{a^2N}} = \frac{1}{\sqrt{2^2*4}} = \frac{1}{\sqrt{16}} = \frac{1}{4} \quad (3)$$

In other words, according to the information processing method of the present embodiment, an improvement factor achieved by using eight inertial sensors in the comparison technique can be achieved by using the four inertial sensors which is half the number. Therefore, according to the information processing method of the present embodiment, the sensor terminal 10 on which the inertial sensors are mounted can be further downsized, and the sensor terminal 10 can be widely used in accordance with various kinds of uses.

Figure 14:
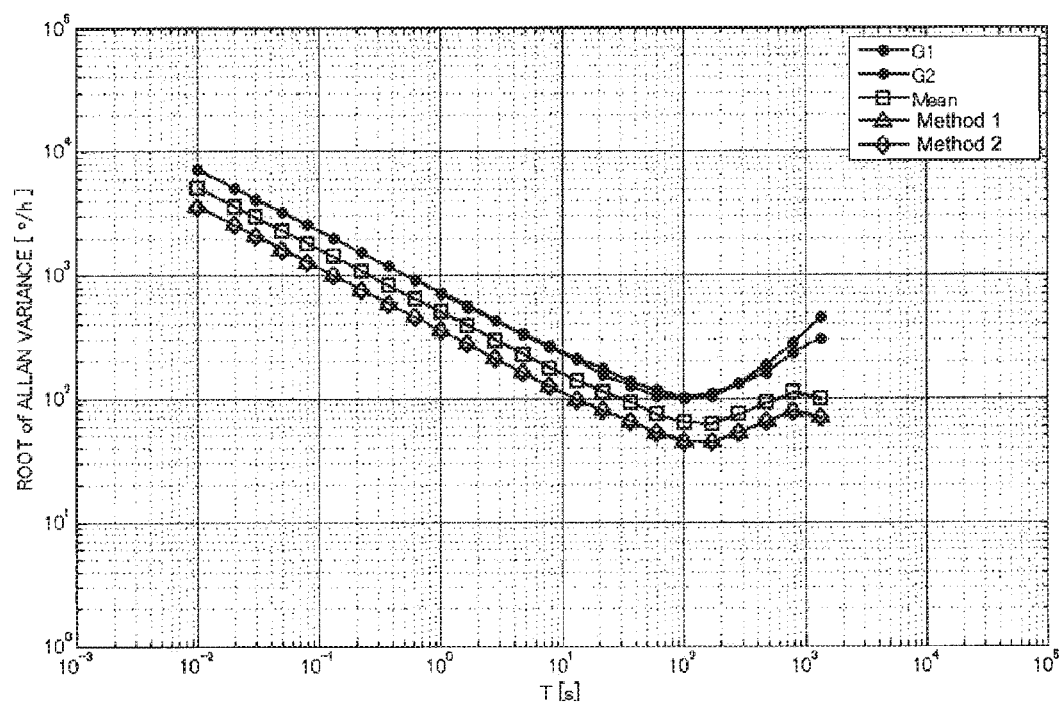
FIG. 14 is a diagram illustrating noise characteristics as an Allan variance plot when the combining processing is simulated by an information processing method according to the embodiment and a comparison technique.
Figure 15:
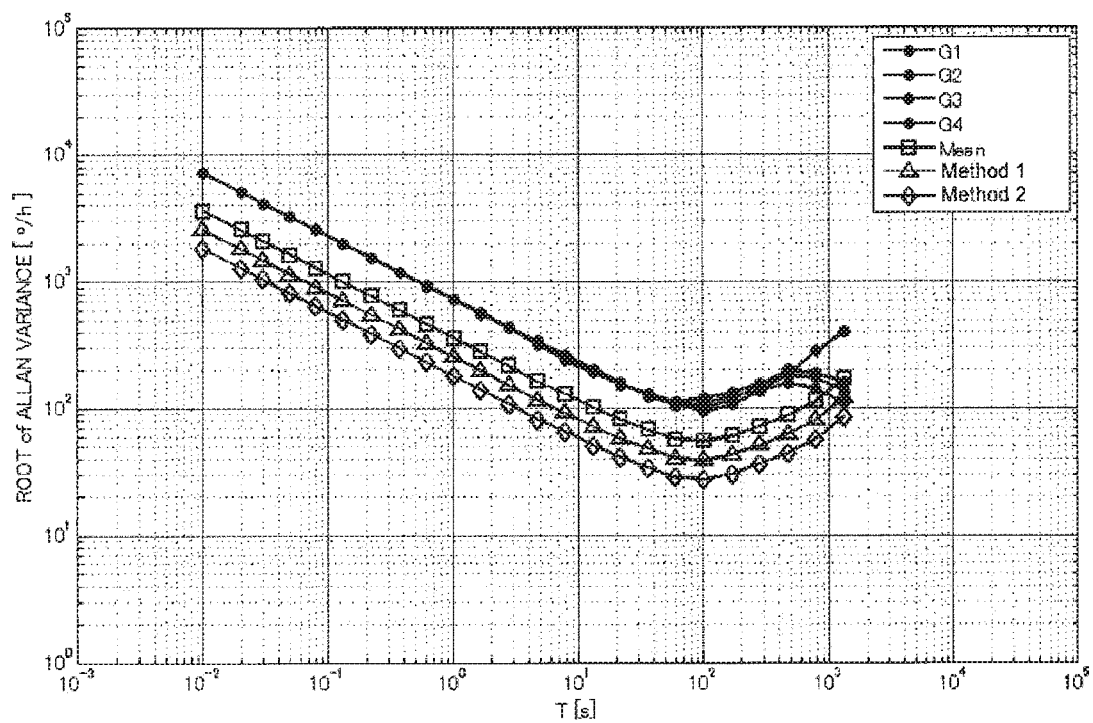
FIG. 15 is a diagram illustrating noise characteristics as an Allan variance plot when the combining processing is simulated by the information processing method according to the embodiment and the comparison technique.
Figure 16:
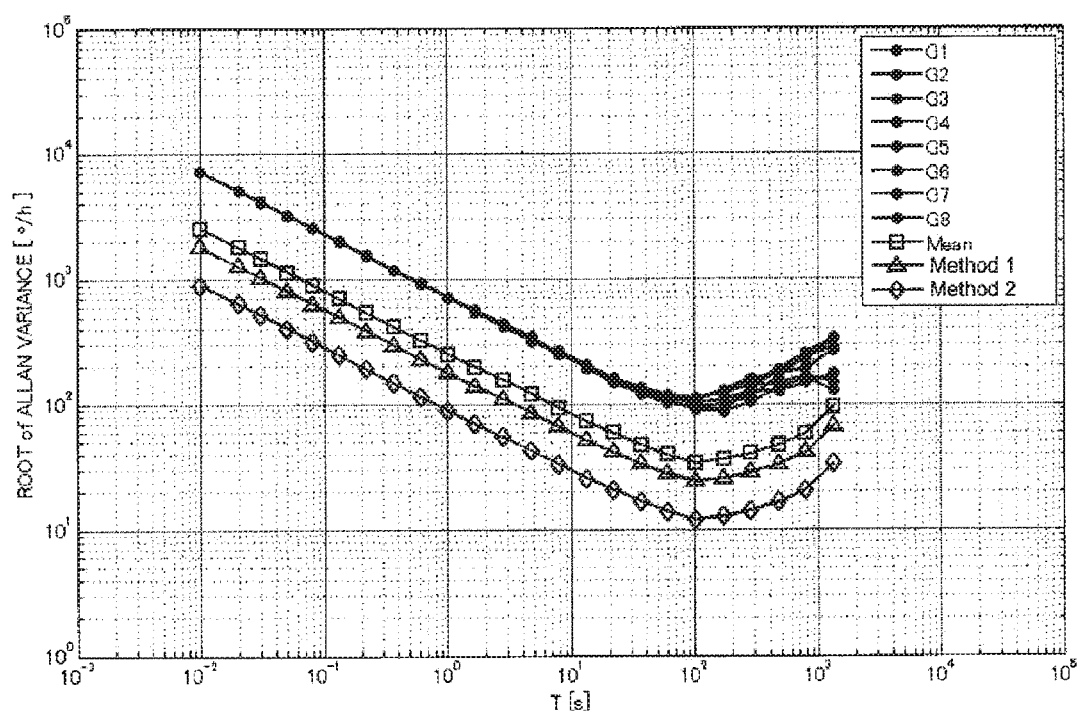
FIG. 16 is a diagram illustrating noise characteristics as an Allan variance plot when the combining processing is simulated by the information processing method according to the embodiment and the comparison technique.

Next, a simulation result relating to the effects of the information processing method according to the present embodiment will be described. FIGS. 14 to 16 are diagrams illustrating noise characteristics represented by Allan Variance Plots when the combining processing is simulated by the information processing method according to the present embodiment and the comparison technique. Note that MEMS gyro sensors are selected as inertial sensors relating to the simulations.

In FIGS. 14 to 16, the respective gyro sensors, a mean of the gyro sensors, and noise characteristics of output signals obtained from combining by the comparison technique and combining by the information processing method according to the present embodiment are illustrated, respectively.

FIG. 14 illustrates a simulation result at the time of combining two MEMS gyro sensors. In the case of combining the two MEMS gyro sensors, the number of steps in the information processing method according to the present embodiment becomes automatically one. Therefore, the information processing method according to the present embodiment and the comparison technique are plotted at the same values in FIG. 14.

Furthermore, FIG. 15 illustrates simulation results at the time of combining four MEMS gyro sensors. Here, the simulations are performed under the conditions that: the number of output signals (M) in a cluster=2; and the number of steps (S)=2. As illustrated in FIG. 15, in the simulation result using the information processing method according to the present embodiment, the plot is shifted downward as compared with the comparison technique, and it is found that the noise is effectively reduced.

Furthermore, FIG. 16 illustrates simulation results at the time of combining eight MEMS gyro sensors. Here, the simulations are performed under the conditions that: the number of output signals (M)=2 in a cluster; and the number of steps (S)=3. In this case, in the simulation result using the information processing method according to the present embodiment, the plot is largely shifted downward as compared with the comparison technique, and it is found that the noise is more effectively reduced due to the increase in the number of steps.

Furthermore, FIG. 17 is a diagram illustrating improvement factors of angle random walk (ARW) and bias stability in the simulation at the time of combining the above eight MEMS gyro sensors.

Referring to FIG. 17, the improvement factors of the ARW and the bias stability obtained by the information processing method according to the present embodiment exhibit records of 8.02 and 8.44, respectively. Thus, according to the present embodiment, it is found that the result almost coincident with the above-described arithmetic expression of the improvement factor, that is, $\sqrt{(2^S*N)}$ is obtained.

In the above, the effects provided by the information processing method according to the present embodiment have been described. As described above, according to the information processing method of the present embodiment, accuracy of an output signal can be effectively improved by stepwisely combining the plurality of inertial sensors. Furthermore, according to the information processing method according to the present embodiment, it is possible to maintain target accuracy of an output signal with the smaller number of inertial sensors.

Note that, in the above description, the case where the MEMS gyro sensors are used as the inertial sensors has been described as the example, but the inertial sensors according to the present embodiment are not limited to this example. The information processing method according to the present embodiment is also applicable to an acceleration sensor, and an optical gyro sensor, and a quantum gyro sensor, and the like. Furthermore, the information processing method according to the present embodiment is also applicable to a case of improving accuracy of information measured by using a vibrator or a clock, for example. The information processing method according to the present embodiment is widely applicable as an effective technique that improves accuracy of a sensor.

2. Exemplary Hardware Configuration

Figure 18:
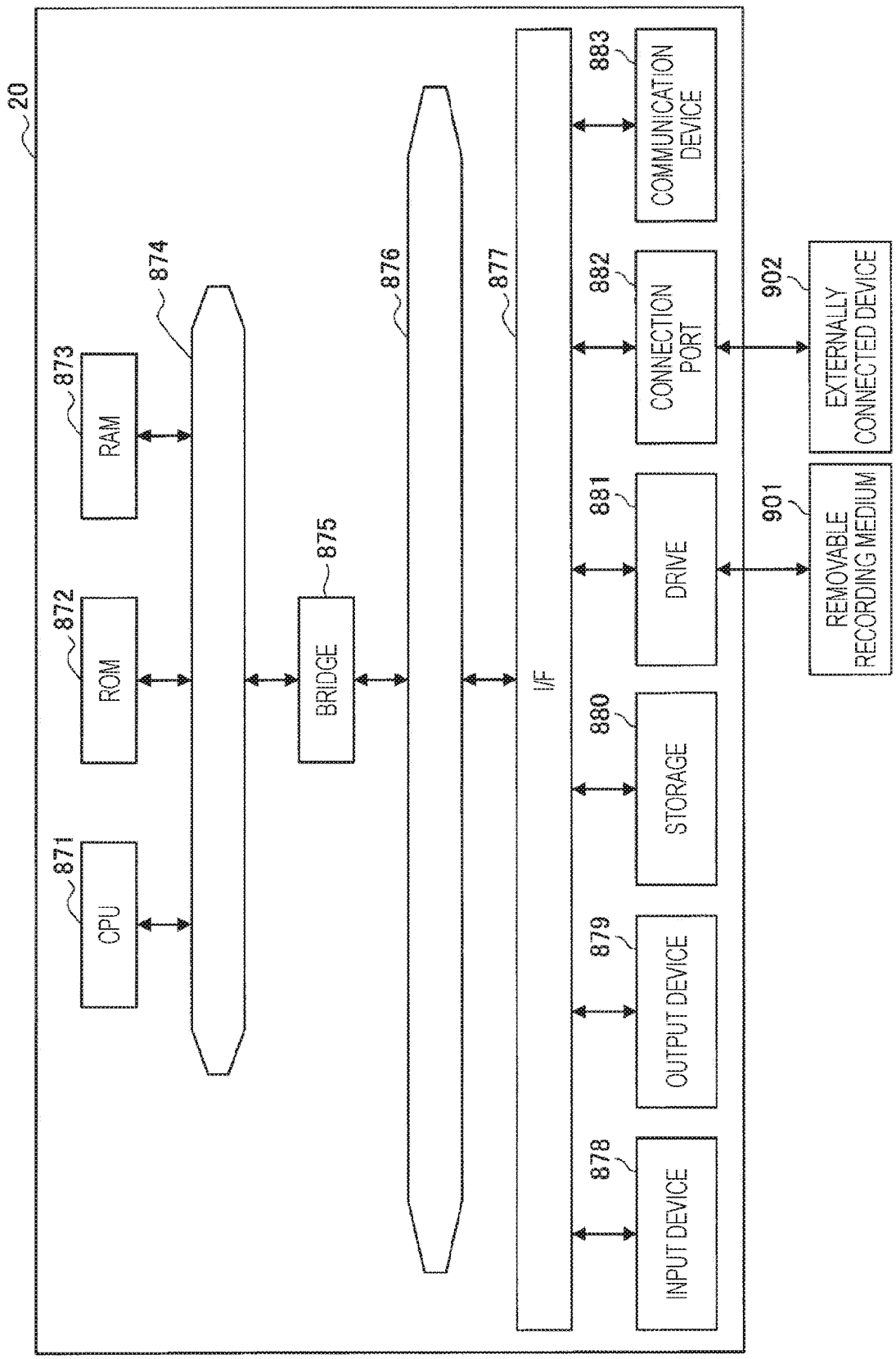
FIG. 18 is a diagram illustrating an exemplary hardware configuration of the information processing device according to an embodiment of the present disclosure.

Next, an exemplary hardware configuration common in the sensor terminal 10 and the information processing device 20 according to the embodiment of the present disclosure will be described. FIG. 18 is a block diagram illustrating the exemplary hardware configuration of the information processing device 20 according to the embodiment of the present disclosure. Referring to FIG. 18, the information processing device 20 includes, for example, a CPU 871, a ROM 872, a RAM 873, a host bus 874, a bridge 875, an external bus 876, an interface 877, an input device 878, and an output device 879, a storage 880, a drive 881, a connection port 882, and a communication device 883. Note that the hardware configuration illustrated here is an example, and some of constituent elements may be omitted. Furthermore, a constituent element other than the constituent elements illustrated herein may be further included.

(CPU871)

The CPU 871 functions as, for example, an arithmetic processing device or a control device, and controls entire or partial operation of the respective constituent elements on the basis of various kinds of programs recorded in the ROM 872, the RAM 873, the storage 880, or the removable recording medium 901.

(ROM872, RAM873)

The ROM 872 is a means that stores a program read by the CPU 871, data used for arithmetic operation, and the like. The RAM 873 temporarily or permanently stores, for example, a program read by the CPU 871, various kinds of parameters, and the like varied as appropriate at the time of executing the program.

(Host Bus 874, Bridge 875, External Bus 876, and Interface 877)

The CPU 871, the ROM 872, and the RAM 873 are connected to each other via, for example, the host bus 874 capable of performing high-speed data transmission. On the other hand, the host bus 874 is connected to, via the bridge 875, the external bus 876 that performs a relatively low-speed data transmission, for example. Furthermore, the external bus 876 is connected to the various kinds of constituent elements via the interface 877.

(Input Device 878)

As the input device 878, for example, a mouse, a keyboard, a touch panel, a button, a switch, a lever, and the like are used. Furthermore, as the input device 878, a remote controller (hereinafter referred to as a remocon) capable of transmitting a control signal by utilizing infrared rays or other radio waves may be used. Furthermore, the input device 878 includes a voice input device such as a microphone.

(Output Device 879)

The output device 879 is a device capable of visually or audibly notify a user of acquired information, and includes, for example, a display device of a cathode ray tube (CRT), an LCD, an organic EL, or the like, an audio output device such as a speaker, a headphone, or the like, a printer, a mobile phone, a facsimile, or the like. Furthermore, the output device 879 according to the present disclosure includes various kinds of vibration devices capable of outputting a tactile stimulus.

(Storage 880)

The storage 880 is a device to store various kinds of data. As the storage 880, for example, a magnetic storage device such as a hard disk drive (HDD), a semiconductor storage device, an optical storage device, a magneto-optical storage device, or the like is used.

(Drive 881)

The drive 881 is a device that reads information recorded on a removable recording medium 901 such as a magnetic disk, an optical disc, a magneto-optical disc, a semiconductor memory, or the like, or writes information in the removable recording medium 901, for example.

(Removable Recording Medium 901)

The removable recording medium 901 includes, for example, a DVD medium, a Blu-ray (registered trademark) medium, an HD/DVD medium, various kinds of semiconductor storage media, or the like. Needless to mention, the removable recording medium 901 may include, for example: an IC card on which a non-contact IC chip is mounted; an electronic device; or the like.

(Connection Port 882)

The connection port 882 is a port to connect, for example, an externally connected device 902 such as a universal serial bus (USB) port, an IEEE 1394 port, a small computer system interface (SCSI), an RS-232C port, or an optical audio terminal, or the like.

(Externally Connected Device 902)

The externally connected device 902 includes, for example, a printer, a portable music player, a digital camera, a digital video camera, an IC recorder, or the like.

(Communication Device 883)

The communication device 883 includes a communication device to provide connection to a network and includes, for example: a communication card for wired or wireless LAN, Bluetooth (registered trademark), or a wireless USB (WUSB); a router for optical communication; a router for an asymmetric digital subscriber line (ADSL); various kinds of communication modems; or the like.

3. Conclusion

As described above, the information processing device 20 that implements the information processing method according to the embodiment of the present disclosure has one of the features in which output signals relating to a plurality of inertial sensors are stepwisely combined. Furthermore, the information processing device 20 according to the embodiment of the present disclosure may cluster a plurality of output signals into a plurality of clusters and stepwisely combines the output signals in each of the clusters Furthermore, at least one of the above clusters may include a plurality of output signals. According to this configuration, it is possible to easily and more accurately acquire an output signal relating to the plurality of inertial sensors.

While the preferred embodiments of the present disclosure have been described in detail with reference to the attached drawings, the technical scope of the present disclosure is not limited to the examples. It is obvious that a person having ordinary skill in the technical field of the present disclosure can readily conceive various kinds of modified examples or revised examples within the scope of the technical idea described in the claims, and it should be understood that these examples are also included in the technical scope of the present disclosure.

Additionally, the effects described in the present specification are merely illustrative or exemplary and are not limitative. That is, the technology according to the present disclosure can provide, in addition to or instead of the above-described effects, another effect that may be obvious to those skilled in the art from the description of the present specification.

Note that the following configurations are also included in the technical scope of the present disclosure.

(1)

An information processing device including a combining unit that stepwisely combines output signals relating to a plurality of inertial sensors, in which the combining unit clusters a plurality of the output signals into a plurality of clusters and stepwisely combines the output signals in each of the clusters, and at least one of the clusters includes a plurality of the output signals.

(2)

The information processing device according to (1) above, in which the inertial sensor includes a gyro sensor.

(3)

The information processing device according to (1) or (2) above, in which the combining unit further clusters the output signals combined in each of the clusters, and further combines the output signals in each of the clusters formed.

(4)

The information processing device according to any one of (1) to (3) above, in which the combining unit determines, for each of the clusters, the number of the output signals included in each of the clusters in a same step level.

(5)

The information processing device according to any one of (1) to (4) above, in which the combining unit dynamically determines the number of step levels relating to combining of the output signals and the number of the output signals included in each of the clusters.

(6)

The information processing device according to any one of (1) to (5) above, in which the combining unit performs the clustering on the basis of a machine learning technique.

(7)

The information processing device according to any one of (1) to (6) above, further including a processing control unit that controls, on the basis of usage of the output signals, combining of the output signals by the combining unit.

(8)

The information processing device according to (7) above, in which the processing control unit controls the combining of the output signals by the combining unit in accordance with characteristics of an application that uses the output signal.

(9)

The information processing device according to (7) or (8) above, in which the processing control unit controls the combining of the output signals by the combining unit on the basis of an environmental state or a user state estimated on the basis of sensor information.

(10)

The information processing device according to (9) above, in which the sensor information includes at least any one of acceleration information, geomagnetic information, and image information.

(11)

The information processing device according to any one of (7) to (10) above, in which the processing control unit controls the combining of the output signals by the combining unit on the basis of allowable accuracy relating to the output signals.

(12)

The information processing device according to (11) above, in which, when the output signal satisfies the allowable accuracy in stepwise combining processing of the output signals by the combining unit, the processing control unit passes the output signal to an application compatible with the allowable accuracy.

(13)

The information processing device according to (12) above, in which in a case where the output signal satisfies the allowable accuracy, the processing control unit terminates the combining processing of the output signals performed by the combining unit.

(14)

The information processing device according to any one of (1) to (13) above, in which the combining unit combines the output signals relating to at least three or more of the inertia sensors.

(15)

The information processing device according to any one of (1) to (14) above, further including a plurality of the inertial sensors.

(16)

An information processing method including stepwisely combining, by a processor, output signals relating to a plurality of inertial sensors, in which the combining further includes clustering a plurality of the output signals into a plurality of clusters and stepwisely combining the output signals in each of the clusters, and at least one of the clusters includes a plurality of the output signals.

(17)

A program that causes a computer to function as an information processing device including a combining unit that stepwisely combines output signals relating to a plurality of inertial sensors, in which the combining unit clusters a plurality of the output signals into a plurality of clusters and stepwisely combines the output signals in each of the clusters, and at least one of the clusters includes a plurality of the output signals.

REFERENCE SIGNS LIST

10 Sensor terminal
110 Sensor unit
120 Input unit
130 Output unit
140 Control unit
150 Communication unit
20 Information processing device
210 Combining unit
220 Processing control unit
230 Terminal communication unit
30 Network

The invention claimed is:

1. An information processing device, comprising:
a combining unit configured to:
stepwisely combine a first plurality of output signals relating to a plurality of inertial sensors;
cluster the first plurality of output signals into a plurality of first clusters and stepwisely combine output signals in each of the plurality of first clusters, wherein
at least one of the plurality of first clusters includes a second plurality of output signals of the first plurality of output signals; and
cluster the output signals combined in each of the plurality of first clusters to at least one second cluster and combine the output signals in each of the at least one second cluster formed.

2. The information processing device according to claim 1, wherein the plurality of inertial sensors includes a gyro sensor.

3. The information processing device according to claim 1, wherein the combining unit is further configured to determine, for each of the plurality of first clusters and at least one second cluster, a count of the output signals in a same step level.

4. The information processing device according to claim 1, wherein the combining unit is further configured to dynamically determine a number of step levels relating to combining of the output signals and a count of the output signals included in each of the plurality of first clusters and the at least one second cluster.

5. The information processing device according to claim 1, wherein the combining unit is further configured to cluster the first plurality of output signals based on a machine learning technique.

6. The information processing device according to claim 1, further comprising a processing control unit configured to control, based on usage of the output signals, the combining unit to combine the output signals.

7. The information processing device according to claim 6, wherein the processing control unit is further configured to control, based on characteristics of an application that uses the output signals, the combining unit to combine the output signals.

8. The information processing device according to claim 6, wherein
the processing control unit is further configured to control, based on one of an environmental state or a user state, the combining unit to combine the output signals, and
the one of the environmental state or the user state is based on sensor information.

9. The information processing device according to claim 8, wherein the sensor information includes at least any one of acceleration information, geomagnetic information, or image information.

10. The information processing device according to claim 6, wherein the processing control unit is further configured to control, based on an allowable accuracy relating to output signals, the combining unit to combine the output signals.

11. The information processing device according to claim 10, wherein, when a final output signal satisfies the allowable accuracy in a stepwise combining process of the output signals by the combining unit, the processing control unit is further configured to pass the final output signal to an application compatible with the allowable accuracy.

12. The information processing device according to claim 11, wherein, based on the final output signal satisfies the allowable accuracy, the processing control unit is further configured to terminate the stepwise combining process of the output signals by the combining unit.

13. The information processing device according to claim 1, wherein the plurality of inertial sensors corresponds to at least three inertial sensors.

14. The information processing device according to claim 1, further comprising the plurality of inertial sensors.

15. An information processing method, comprising:
stepwise combining, by a processor, a first plurality of output signals relating to a plurality of inertial sensors;
clustering the first plurality of output signals into a plurality of first clusters and stepwise combining output signals in each of the plurality of first clusters, wherein
at least one of the plurality of first clusters includes a second plurality of output signals of the first plurality of output signals; and
clustering the output signals combined in each of the plurality of first clusters to at least one second cluster and combining the output signals in each of the at least one second cluster formed.

16. A non-transitory computer-readable medium having stored thereon computer-executable instructions which, when executed by an image processing apparatus, cause the image processing apparatus to execute operations, the operations comprising:
stepwise combining a first plurality of output signals relating to a plurality of inertial sensors;
clustering the first plurality of output signals into a plurality of first clusters and stepwise combining output signals in each of the plurality of first clusters, wherein
at least one of the plurality of first clusters include a second plurality of output signals of the first plurality of output signals; and
clustering the output signals combined in each of the plurality of first clusters to at least one second cluster and combining the output signals in each of the at least one second cluster formed.

17. An information processing device, comprising:
a combining unit configured to:
stepwise combine a first plurality of output signals relating to a plurality of inertial sensors;
cluster the first plurality of output signals into a plurality of first clusters and stepwise combine output signals in each of the plurality of first clusters, wherein
at least one of the plurality of first clusters includes a second plurality of output signals of the first plurality of output signals; and
cluster the output signals combined in each of the plurality of first clusters to at least one second cluster, and combine the output signals in each of the at least one second cluster formed; and
a processing control unit configured to:
control, based on an allowable accuracy relating to output signals, the combining unit to combine the output signals,
wherein, when a final output signal satisfies the allowable accuracy in a stepwise combining process of the output signals by the combining unit, the processing control unit is further configured to pass the final output signal to an application compatible with the allowable accuracy, and
wherein, based on the final output signal satisfies the allowable accuracy, the processing control unit is further configured to terminate the stepwise combining process of the output signals by the combining unit.

* * * * *